US012621161B1

(12) United States Patent
Noe et al.

(10) Patent No.: US 12,621,161 B1
(45) Date of Patent: May 5, 2026

(54) AUTOMATED SOFTWARE BUILD CAPACITY INCORPORATING CODE GENERATED IN SOFTWARE DEVELOPMENT ENVIRONMENTS WITH VARYING LEVELS OF SECURITY

(71) Applicant: NORTHROP GRUMMAN SYSTEMS CORPORATION, Falls Church, VA (US)

(72) Inventors: Brian J. Noe, Indian Harbour Beach, FL (US); Francis B. Afinidad, Melbourne, FL (US); Brian Wilkins, Melbourne, FL (US); Catherine M. Boyce, West Melbourne, FL (US); Douglas M. Dyer, Melbourne, FL (US); Steven D. Ratts, Indian Harbour Beach, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1012 days.

(21) Appl. No.: 17/307,583

(22) Filed: May 4, 2021

(51) Int. Cl.
*H04L 9/32* (2006.01)
*G06F 8/41* (2018.01)
(Continued)

(52) U.S. Cl.
CPC .............. *H04L 9/3239* (2013.01); *G06F 8/44* (2013.01); *G06F 8/71* (2013.01); *G06F 21/57* (2013.01);
(Continued)

(58) Field of Classification Search
CPC .... G06F 21/16; G06F 21/602; G06F 21/6209; G06F 21/10; G06F 21/12; G06F 21/60;
(Continued)

(56) References Cited

U.S. PATENT DOCUMENTS

| | | | | |
|---|---|---|---|---|
| 5,822,226 A | | 10/1998 | Watkins et al. | |
| 6,157,721 A | * | 12/2000 | Shear ..................... | G06Q 20/24 713/180 |

(Continued)

OTHER PUBLICATIONS

Non Final Office Action for U.S. Appl. No. 16/425,614 dated May 7, 2021.

*Primary Examiner* — Tae K Kim

(74) *Attorney, Agent, or Firm* — KATTEN MUCHIN ROSENMAN LLP

(57) ABSTRACT

Systems and methods are provided for automatically building software in a secure environment. A system includes a software development environment, having an associated security level. The software development environment generates an encrypted software module containing a software module and a cryptographic hash representing a content of the software module and provides it to a software repository. The software repository, in response to receipt of a build plan, decrypts the encrypted software module to recover the software module and the cryptographic hash representing the content of the software module, generates a new cryptographic hash for the software module, and verifies that the new cryptographic hash matches the cryptographic hash representing the content of the software module. A build environment receives the plurality of software modules from the software repository and generates a software build from the plurality of software modules based upon the build plan.

10 Claims, 4 Drawing Sheets

(51) Int. Cl.
*G06F 8/71* (2018.01)
*G06F 21/57* (2013.01)
*H04L 9/30* (2006.01)

(52) U.S. Cl.
CPC .......... *H04L 9/30* (2013.01); *G06F 2221/033* (2013.01); *G06F 2221/2113* (2013.01)

(58) Field of Classification Search
CPC .......... G06F 21/64; G06F 21/645; G06F 8/36; G06F 8/30; G06F 8/20; G06F 8/63; G06F 8/60; G06F 8/70; G06F 8/71; G06F 8/40; G06F 8/41
See application file for complete search history.

(56) References Cited

U.S. PATENT DOCUMENTS

| | | | | |
|---|---|---|---|---|
| 6,267,016 | B1 * | 7/2001 | Call | G01N 1/2273 |
| | | | | 73/863.22 |
| 7,120,802 | B2 * | 10/2006 | Shear | G06Q 20/085 |
| | | | | 705/57 |
| 7,243,236 | B1 * | 7/2007 | Sibert | H04L 9/3247 |
| | | | | 713/168 |
| 7,278,056 | B2 | 10/2007 | Hekmatpour | |
| 7,370,233 | B1 | 5/2008 | Sobel et al. | |
| 8,874,916 | B2 | 10/2014 | Smith et al. | |
| 9,507,929 | B1 * | 11/2016 | Kumar | G06F 21/44 |
| 9,684,579 | B1 * | 6/2017 | Adams | G06F 11/261 |
| 9,703,579 | B2 | 7/2017 | Suresh et al. | |
| 9,959,100 | B2 * | 5/2018 | Straub | G06F 8/31 |
| 11,328,065 | B1 * | 5/2022 | Wall | G06F 21/51 |
| 11,494,493 | B1 * | 11/2022 | Baird | H04L 9/0894 |
| 2002/0023214 | A1 * | 2/2002 | Shear | G11B 27/329 |
| | | | | 713/188 |
| 2009/0300049 | A1 | 12/2009 | Zhang et al. | |
| 2010/0223469 | A1 * | 9/2010 | Hussain | G06F 21/64 |
| | | | | 713/175 |
| 2012/0324446 | A1 * | 12/2012 | Fries | H04L 9/3236 |
| | | | | 718/1 |
| 2013/0014275 | A1 * | 1/2013 | Goodes | G06F 9/44521 |
| | | | | 719/331 |
| 2013/0152047 | A1 * | 6/2013 | Moorthi | G06F 11/3664 |
| | | | | 717/124 |
| 2013/0318486 | A1 | 11/2013 | Sasaki | |
| 2014/0095876 | A1 | 4/2014 | Smith et al. | |
| 2014/0109078 | A1 * | 4/2014 | Lang | G06F 21/53 |
| | | | | 717/172 |
| 2014/0259004 | A1 * | 9/2014 | Devarajan | G06F 8/65 |
| | | | | 717/173 |
| 2015/0012737 | A1 | 1/2015 | Newell | |
| 2015/0095653 | A1 * | 4/2015 | Shim | G06F 21/54 |
| | | | | 713/181 |
| 2015/0149633 | A1 * | 5/2015 | Foti | H04L 67/562 |
| | | | | 709/226 |
| 2016/0117519 | A1 | 4/2016 | Hashii et al. | |
| 2017/0147338 | A1 * | 5/2017 | Jackson | G06F 11/36 |
| 2018/0041341 | A1 | 2/2018 | Gulati | |
| 2018/0129483 | A1 * | 5/2018 | Biddle | G06F 11/3668 |
| 2018/0373848 | A1 * | 12/2018 | Lafortune | G06F 21/629 |
| 2019/0205528 | A1 * | 7/2019 | Bogaert | G06F 21/121 |
| 2019/0272705 | A1 * | 9/2019 | Ruiz | G06F 21/602 |
| 2019/0273607 | A1 * | 9/2019 | Van Der Velden | H04L 9/088 |
| 2020/0125345 | A1 * | 4/2020 | Belagali | G06F 11/368 |
| 2020/0167472 | A1 * | 5/2020 | Hertenstein | H04L 9/3236 |
| 2020/0184077 | A1 * | 6/2020 | Venkataraman | G06F 21/575 |
| 2020/0218821 | A1 * | 7/2020 | Liu | H04L 63/0442 |
| 2021/0216307 | A1 * | 7/2021 | Subramanian | G06F 8/36 |
| 2021/0281408 | A1 * | 9/2021 | Liu | H04L 9/3297 |
| 2021/0405976 | A1 * | 12/2021 | Gaitonde | G06F 11/3664 |
| 2022/0164452 | A1 * | 5/2022 | Landman | G06F 16/9027 |

\* cited by examiner

AUTOMATED SOFTWARE BUILD CAPACITY INCORPORATING CODE GENERATED IN SOFTWARE DEVELOPMENT ENVIRONMENTS WITH VARYING LEVELS OF SECURITY

TECHNICAL FIELD

This invention relates to cybersecurity, and more particularly, to securely building software incorporating code generated in software development environments with varying levels of security.

BACKGROUND

Modern military and civilian government systems need to combine software developed at multiple classification levels, typically including both commercial off the shelf (COTS) software and mission-specific software residing at multiple classification levels. These systems typically require multiple software build configurations (e.g., tactical/operational, test, maintenance, etc.) that serve different purposes and may therefore be composed from a subset of software modules and data specific to their intended purpose. For example, a maintenance software build may omit software and data components that are not required to accomplish maintenance activities and thus not needed by maintenance personnel. Similarly a test build may include some additional test-specific software components or test variants of software components. Such software builds may also need to be compatible with system level requirements limiting the highest classification level needed to perform maintenance activities.

SUMMARY OF THE INVENTION

In one example, a system includes a software development environment, having an associated security level. The software development environment generates an encrypted software module containing a software module and a cryptographic hash representing a content of the software module and provides it to a software repository. The software repository, in response to receipt of a build plan, decrypts the encrypted software module to recover the software module and the cryptographic hash representing the content of the software module, generates a new cryptographic hash for the software module, and verifies that the new cryptographic hash matches the cryptographic hash representing the content of the software module. A build environment receives the plurality of software modules from the software repository and generates a software build from the plurality of software modules based upon the build plan.

In another example, a method is provided. The method includes developing a software module and reviewing the software module to establish a security level for the software module. A cryptographic hash representing the contents of the software module is generated and the software module and the cryptographic hash are encrypted using a key to provide an encrypted software module. The key is associated with the security level of the software module. The encrypted software module is sent to a software repository.

In yet another example, a method is provided. The method includes providing a build plan requiring a plurality of software modules to a software repository storing a plurality of encrypted software modules corresponding to the required plurality of software modules. Each of the plurality of encrypted software modules are encrypted to provide the plurality of software modules and a plurality of cryptographic hashes. Each cryptographic hash represents the content of one of the plurality of software modules. A new cryptographic hash is generated for each of the plurality of software modules, and it is verified that the new cryptographic hash for each of the plurality of software modules matches the cryptographic hash representing the content of the software module. The plurality of software modules are provided to a selected build environment.

DETAILED DESCRIPTION

Figures 1, 2:
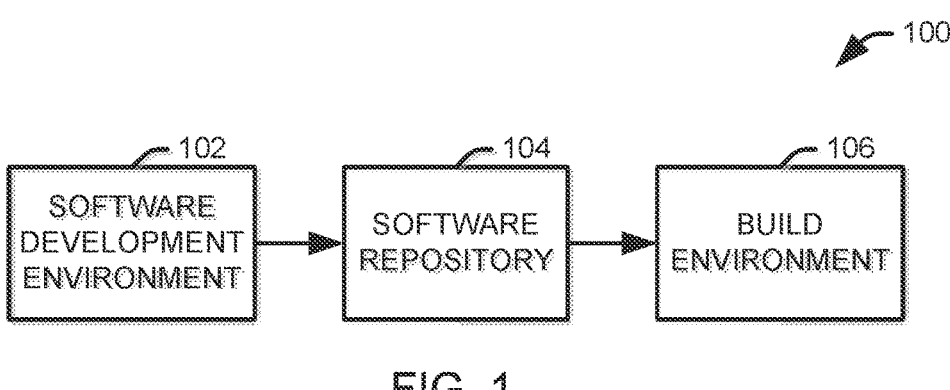
FIG. 1 illustrates one example of a system for building software that can incorporate code generated in software development environments with varying levels of security.
FIG. 2 illustrates one implementation of a system for building software that can incorporate code generated in software development environments with varying levels of security.

As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

As used herein, a "software build environment" or "build environment" is a collection of hardware and software tools that a system developer uses to build software systems, specifically to convert source code into software artifacts that can be executed on appropriate hardware, test the function of the compiled code, and maintain the code (e.g., correct faults, improve performance or other attributes, or adapt the product to a modified environment). A software build environment can include compilers, scripting tools, libraries, build automation, test suites, and source repositories, generally available via a host server.

As used herein, a "software module" is a set of complied or uncompiled code that may be utilized as all or part of a software build. For example, a software module can be a set of code used to perform a task within a larger software build that can be reused for later software builds.

A "software build" is a set of software modules that have each been compiled into a binary file, an executable file, or similar software artifact that can be used with appropriate hardware to perform an associated function.

A "security level" of an environment, software module, or software build, as used herein, represents a hierarchical limitation of access to the environment or software to a set of authorized users, where authorization of a user for a level in the hierarchy includes access to levels lower in the hierarchy but does not include access to levels higher in the hierarchy. One example of a set of security levels can include the security classifications used by the United States government, which include Unclassified, Confidential, Secret, and Top Secret levels, as well as levels associated with additional security constraints (e.g., Special Access Required—SAR).

In software development for government systems, security policies and procedures generally allow for material classified at a lower level to be transferred to and held on computer networks that are authorized to hold material up to a higher level, but impose restrictions or prohibitions on transferring material from a higher classification level down to a lower one. This constraint results in a software build process that integrates material from all levels requiring that such builds be produced at the highest classification level of any component needed for integration or test in accordance with all applicable constraints. The resulting software build package is then classified at the level of the computer network on which it was produced, making transmission of individual code modules back down to computer networks operating at lower levels of security difficult or impossible.

The process of software integration requires that all necessary parts to be integrated are present, and that all necessary data needed to test and verify the integration are present. Once the integration is complete and all required tests have been passed for a particular software build, that build is brought into a software repository referred to as configuration management (CM). Any time a copy of that build is needed, it must be obtained from CM as a complete package to ensure that the build package being used conforms to the fully integrated and tested version.

The problem with this approach is that integration and test of software may need to be performed at the highest classification level due to such factors as hardware availability. In such cases, the software build incorporating only material developed at lower classification levels winds up being classified at a higher level because of integration and test activities performed at the higher level. This complicates the distribution of software build packages incorporating only material classified at a lower level, and thus adversely impacts productivity in an agile development environment.

One example of this situation is the production of a maintenance software build intended for use by maintainers who may be cleared only to the collateral Secret level. Such a build may need to be integrated and tested by developers working at a classification level above that, which will result in the integrated and tested Maintenance software build being placed into Configuration Management (CM) at the higher level, and thus needing to originate from that level. This creates a significant production issue where the resulting Maintenance software build needs to go through careful inspection by security and technical Subject Matter Experts (SMEs) prior to being transferred back down to computer networks operating at the lower classification level where it will be used. Similar issues may also be encountered for test software builds incorporating only a subset of mission-specific software or data where that subset doesn't include any material from the highest classification level.

Once software is built at a high level of security, there is no easy way to "downgrade" pieces of the software once they've been integrated with other components at the higher classification level enclave. This is especially problematic if the integration and maintenance activities within the higher level enclave result in changes made to the components originating from the lower enclave. In such cases the content of the software component that is incorporated into the build is then different from the version that was supplied from the lower level enclave. Any change to the lower level component will trigger time consuming and laborious efforts needed to verify that the updated component is still only classified at the lower level and may be communicated back in its updated state to the lower level enclave from which it originated. If the software component is not communicated back, then the lower level enclave will fall out of alignment with the work done in the higher level enclave such that future versions sent up will still have whatever defects or issues were previously corrected at the higher level. This results in additional unnecessary work at the higher level to reapply each fix every time a new version is sent up. Thus, for an agile development environment it is essential to communicate the needed changes from the higher level back down to the lower levels so that the overall development and integration remains in sync.

In a software development environment, code may be developed entirely at a particular level, or it may leverage prior developed code originating from an unclassified source, a source developed at a lower classification level, or pre-existing work held at the same classification level. Modifications of prior developed code at this level typically result in the modified code being classified at this level. If the specific modification needed doesn't necessitate classification of the work product at this level, and if the unmodified baseline branched off of is not already classified at this level, then the modification work may be done at the lower level with the modified result passed up to this level. If this is performed at some intermediate classification level relative to the larger project, then it too will need to be passed up to one or more enclaves operating at a higher classification levels for further development and/or integration. This process repeated for each classification level and caveat at which software development takes place, where the inputs to the process all originate either natively from that level or as products developed at some lower level. In each case the output of the process is either transferred up to an enclave operating at a higher classification level, or, for the highest level enclave, retained.

Once all the software unit code and test has been completed at every classification level, an Integrated Functional Capability (IFC) is created to test the all the software together on representative final target hardware configuration. Because of hardware costs, this final integrated capability is carried out at the highest level of classification. Once all the IFC completes final qualification testing, this version is loaded into configuration management for candidate release. Any software fixes done on lower level software would have to be re-incorporated into the lower level software for maintaining the final software at all levels. If lower level subsets of the IFC are required, each source file would need to be complied from its original source file (at its classification level) and then re-integrated and tested at that level. For example, a Secret level software build would have to be pulled from just the Unclassified and Secret software, and integrated and tested on Secret level hardware. This would require a complete set of Secret hardware to perform the integration and testing on, including a complete build environment (configuration management, build environment, etc.), thus duplicating cost and schedule.

FIG. 1 illustrates one example of a system 100 for building software that can incorporate code generated in software development environments with varying levels of security. The proposed cryptographically-controlled software build system enables building and deployment of an integrated software capability at multiple security levels from a single software stream. The proposed approach satisfies the Bell-LaPadula (BLP) security model that focuses on data confidentiality and controlled access to classified information as well as the Biba Integrity Model which focuses on data integrity. By taking this hybrid approach the proposed capability can guarantee the integrity of the data created at each security classification and provide the security mechanism to control access to files to build software at multiple classification levels.

The system 100 includes one or more software development environments 102, each having an associated security level. Each software development environment 102 generates an encrypted software module containing a software module and a cryptographic hash representing a content of the software module and providing it to a software repository 104. Accordingly, as each software module is produced or procured at the various security levels it is digitally fingerprinted with the cryptographic hash and then cryptographically signed with a unique cryptographic key for that level to provide the encrypted software module. This provides a cryptographic means to authenticate what security level the software is and prove that the software has not been modified as it is transferred into the software repository. Among other benefits, this prevents changes to the software at higher levels of security from propagating to lower levels of security, providing the integrity check required by the Biba Integrity Model.

Software at the lowest level of security, for example, unclassified, is acquired or developed and initially tested on unclassified hardware. Once this software is ready to transfer to a security enclave at a higher classification level, the code can under quality assurance measures, such as a peer review code check, before being prepared for transfer to the software repository 104. A cryptographic hash is computed for the software module (e.g., using SHA-256, SHA-3, etc.), which acts like a digital fingerprint of a digital file in that the hash value is unique to the particular content of the file. Any change to the file, intentional or otherwise, will result in a hash value that is significantly different. Thus, the cryptographic hash of the reviewed code will produce a unique and particular value that can only result from that version of the code, and any change to the code will result in production of a significantly different hash value.

The cryptographic hash is encrypted using a signing key at the lowest level to produce the cryptographic signature of the file. In one example, the signing key is a private key from a public/private key pair, and the private signing key never leaves the signing facility and is only used to sign material originating at that classification level from that enclave. The corresponding public key may then be used to authenticate the signed material, and can be shared among all enclaves which need to authenticate such files, while the private signing key is held exclusively in the signing facility for the enclave producing the file. Once signed, the software is put into a software assurance process for review before approval for transfer to other security levels within the system 100. Once approved, an appropriate file transfer protocol (e.g., Secure File Transfer) can be used to move files to a network associated with a desired level of security and checked into the software repository 104.

Similarly, the system 100 allows software to be developed at higher levels of security. Code developed at a higher level of security is peer reviewed as part testing to determine the classification level of the software module, generally by two or more subject matter experts. Once this is accomplished, the files are digitally fingerprinted (e.g., SHA computed) and signed using a cryptographic key protected at the same level of security as the software module. Users who can sign and check in files are controlled through policy and training to guarantee these steps are done by competent trained persons with the correct level of security access. Signed files are then checked into the software repository 104.

The software repository 104 can be used in the automated system to control what software can get compiled and deployed. The software repository 104 is implemented a multi-level classified repository that can take software source files and pre-compiled binaries and track their classification and integrity. This repository would by nature have to be approved to hold data up to the highest level of classification of the system and reside at that level. The cryptographic signatures and associated cryptographic hash within its build scripts can be used to control which software modules are compiled together to create an IFC for integrated testing and deployment. In particular, in response to receipt of a build plan, the software repository 104 can decrypt the encrypted software module to recover the software module and the cryptographic hash representing the content of the software module, generate a new cryptographic hash for the software module, and verify that the new cryptographic hash matches the cryptographic hash representing the content of the software module.

As part of the build process, each file's digital signature is checked against its build plan. Each file must have a level of security equal to or less than a level of security associated with the build environment at which the build plan will be executed. In addition, for each source file, a cryptographic hash is computed and compared to the cryptographic hash stored in the software repository to verify the file has not been altered in anyway. Thus, authenticity and integrity are guaranteed. The software modules are then provided to the build environment 106, which generates a software build from the plurality of software modules based upon the build plan.

A given build environment 106 can be implemented as a virtual machine at the appropriate level of the software repository or as a separate set of servers with the appropriate licenses and level of security. When the build environment is implemented separately from the software repository, the software modules can be provided to the build environment 106 via an appropriate secure file transfer protocol, for example, a cross domain solution. Builds are isolated within the build environment 106 by using unique plan keys and ensuring that the directories are cleaned after every build or re-build. In one example, once the final build is complete, the files can be archived (e.g., as a .tar file) and a cryptographic hash can computed on the entire archive file. The archive file and the associated hash are then signed with the appropriate level signing key.

In some implementations, to protect against cross contamination of higher classification items into lower classified environments, a set of procedural protections can also be set in place. The procedural checks can be implemented as part of the Unit Code and Test phase by requiring a two Subject Matter Expert (2-SME) review of all source code and data files to determine the classification level of the particular file. Once at least two subject matter experts have reviewed and verified the classification, then the software module's hash is computed and the file is signed by the appropriate level signing key by individuals who are authorized to sign and seal files, providing another procedural level. The files can then be stored in a multi-level security Configure Management System that segregates data by classification level. Changes to the build environment 106 or its workers are performed via a change management process and is logged, as is the checkout of software modules from the software repository 104.

The combination of the procedural protections and cryptographic signing at appropriate level and build script controls and checks implements the "no read up—no write down" portion of the Bell-LaPadula security model. The hash and cryptographic signing implements the integrity aspects of the Biba model and serves as the security labeling of the Bell-LaPadula model, where only properly signed and hashed objects (i.e., no unsigned, verified code) can be used within the build architecture. The final classification of a software build is based on the highest security label associated with a code file that was used in building the OFP.

FIG. 2 illustrates one implementation of a system 200 for building software that can incorporate code generated in software development environments with varying levels of security. The system 200 includes two software development environments 210 and 220, each comprising respective sets of software development tools 212 and 222. Examples of software development tools can include compilers, scripting tools, libraries, build automation, test suites, and source repositories. It will be appreciated that the specific tools in each development environment will vary with the purpose of the development environment. In the illustrated implementation, the first software development environment 210 has an associated first level of security and the second software development environment 220 has an associated second level of security that is higher than the first level of security.

The software development tools 212 and 222 associated with each software development environment 210 and 220 allow users to collaboratively generate software modules. It will be appreciated that software modules can also be brought into the environment, for example, as commercial off-the-shelf software. Once a given software module has been created or acquired and determined ready to provide to a repository 230, it can be provided to a hash generator 214 and 224 that computes a cryptographic hash representing the content of the software module, for example, as a hash-based message authentication code (HMAC). In one implementation, the hash generator 214 and 224 that generates the cryptographic hash via a Secure Hash Algorithm.

Each of the cryptographic hash and the software module can then be encrypted at an authentication module 216 and 226 using a key that can be associated with the level of security assigned to the software module. For example, the level of security can be assigned according to a level of security associated with a specific development environment or assigned after a review of its contents by one or more subject matter experts. In one implementation, the authentication model 216 and 226 can utilize an asymmetric cryptography system, such that the key is a private key associated with the security level of the software build environment 210 and 220. A public key corresponding to the private key can be provide to the repository and/or any build environments 240 and 250 having a level of security equal to or higher than the level of security associated with the private key. The encrypted software module is then provided to the repository 230 via a repository interface 218 and 228 that implements a secure file transfer protocol.

The repository 230 is configured as a multi-level classified repository that can take software source files and pre-compiled binaries and track their classification and integrity. The repository 230, in the illustrated system 200, is approved to hold data up to the highest level of classification of the system (e.g., the second level of security). The repository 230, in response to a submitted build plan, can release software modules to an associated build environment 240 of a plurality of build environments 240 and 250. It will be appreciated that the build plan can include a list of software modules needed for a particular software build.

As part of the process of releasing the files, the repository 230 can first decrypt each encrypted software module at a decryption component 234 to recover the software module and the cryptographic hash associated with the software module. A hash verification component 236 generates a new cryptographic hash from the software module and compares it to the cryptographic hash associated with the software module ensure that the contents of the file have not been altered. If the hashes do not match, the repository terminates the build process and an error is reported. The software module is not released to a build environment 240 and 250.

If the two cryptographic hashes match for each software module, the software modules can be released to a build environment 240 and 250. A maximum security level associated the files listed in the build plan can then be determined, and a build environment 240 and 250 for the build plan can be selected according to the determined maximum security level. In general, a build plan will be executed at a build environment 240 and 250 have a security level equal to the determined maximum security level, although it will be appreciated that a build environment having a security level exceeding the determined maximum security level could be used in theory. The decrypted software modules can then be provided to the selected build environment (e.g., 240) via an appropriate secure transmission means, such as an implemented cross domain solution.

The build environment (e.g., 240) can compile the software modules into a build, and then generate an archive file (e.g., a .tar file). A cryptographic hash can then be generated to represent the contents of the archive file, and the archive file and the cryptographic hash can be encrypted with a key matching a security level of the build environment, and the encrypted file can be returned to the repository 230 or sent to another build environment for testing or maintenance.

Figure 3:
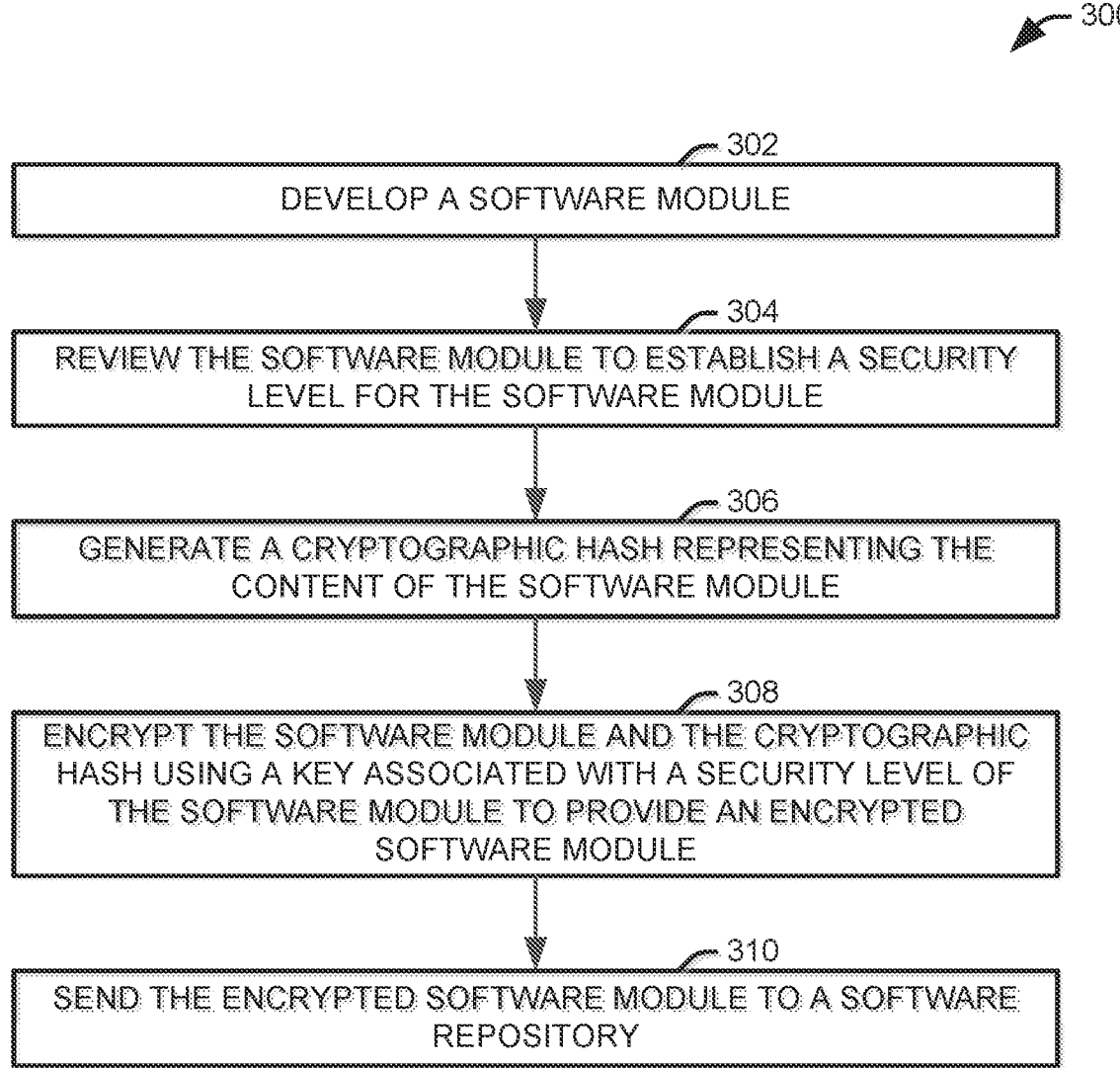
FIG. 3 illustrates a method of providing a software module for a system including software development environments with varying levels of security.
Figure 4:
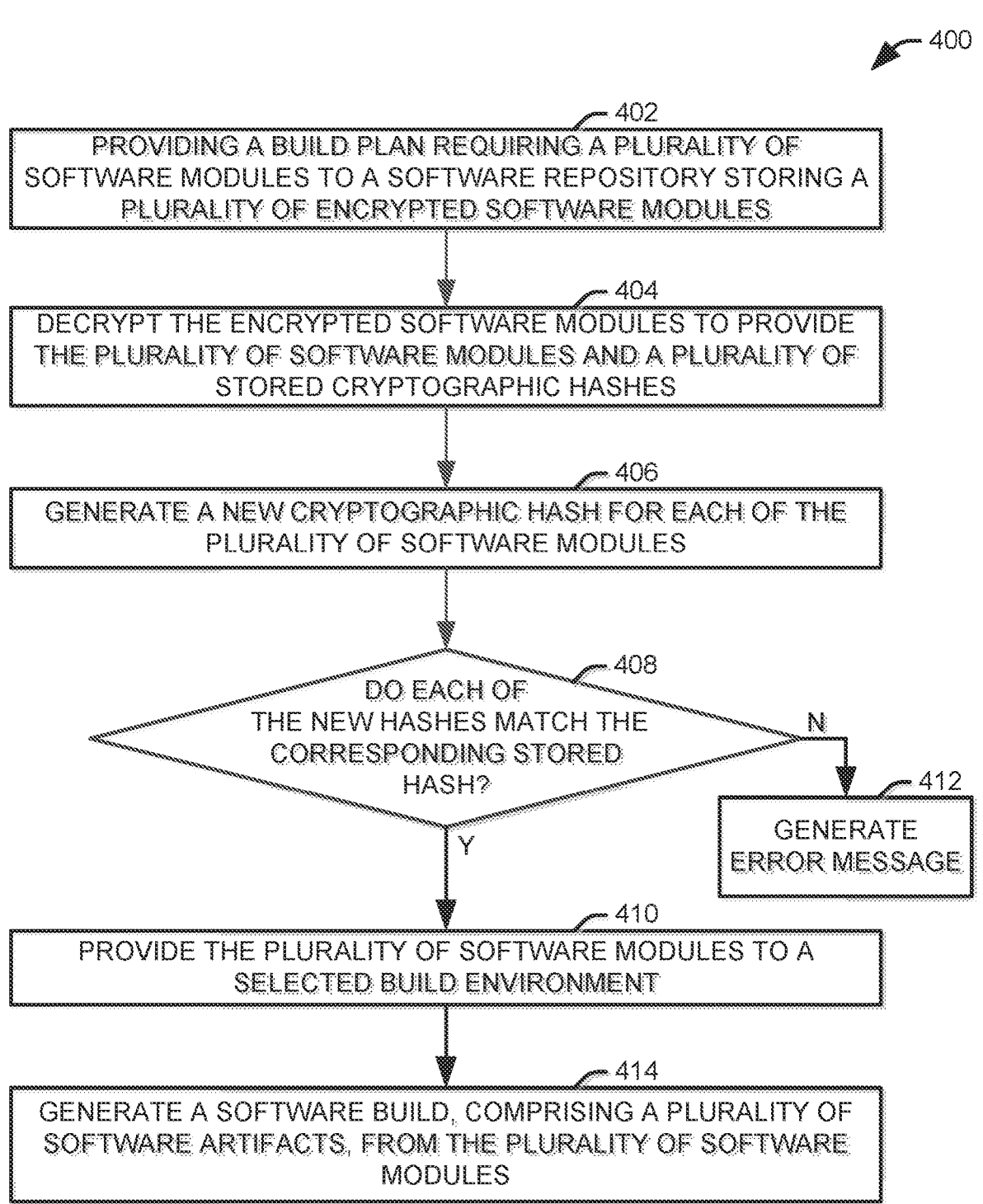
FIG. 4 illustrates a method for executing a build plan in a system including software development environments with varying levels of security.
Figure 5:
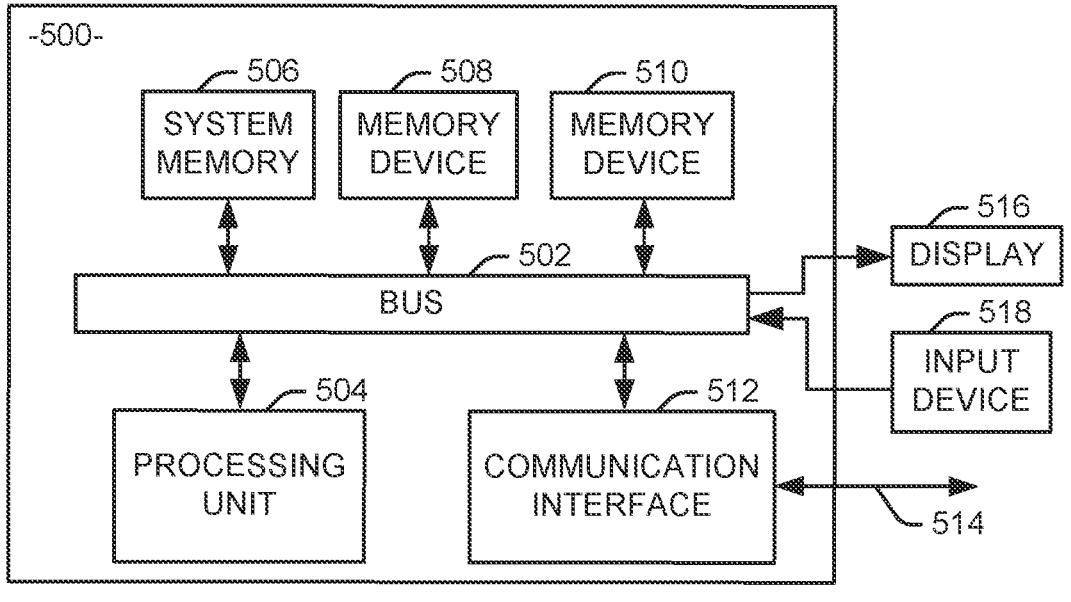
FIG. 5 is a schematic block diagram illustrating an exemplary system of hardware components capable of implementing examples of the systems and methods disclosed herein.

In view of the foregoing structural and functional features described above, example methods will be better appreciated with reference to FIGS. 3 and 4. While, for purposes of simplicity of explanation, the example methods of FIGS. 3 and 4 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates a method 300 of providing a software module for a system including software development environments with varying levels of security. At 302, a software module is developed. It will be appreciated that developing the software module, in this context, can encompass generating the software module as source code, modifying an existing item of source code, or importing software from another source. In one implementation, an existing software module and an error report are retrieved from a software repository and modified in accordance with the error report to provide the software module. At 304, the software module is reviewed to establish a security level for the software module. In one example, this review is performed manually by subject matter experts.

At 306, a cryptographic hash representing the contents of the software module is generated. In one implementation, the cryptographic hash is generated with a Secure Hash Algorithm (SHA). Additionally or alternatively, where the software module is associated with a software build with an associated build number, the cryptographic hash can be generated using a hash key generated using the build number. At 308, the software module and the cryptographic hash are encrypted using a key associated with the security level of the software module to provide an encrypted software module. In one implementation, an asymmetric encryption approach can be employed, with the private key retained at the environment at which the software module is developed, and public keys distributed to the software repository any build or development environments having a level of security equal to or higher than the level of security associated with the key. At 310, the encrypted software module is sent to a software repository. It will be appreciated that the software repository can be a multi-level software repository and the encrypted software module can be sent to a level of the software repository corresponding to the security level of the software module.

FIG. 4 illustrates a method 400 for executing a build plan in a system including software development environments with varying levels of security. At 402, a build plan requiring a plurality of software modules is provided to a software repository. The software repository stores encrypted software modules representing software modules of varying levels of security from which the software modules needed for the build plan can be extracted. At 404, each of the plurality of encrypted software modules is decrypted to provide the plurality of software modules and a plurality of cryptographic hashes, each representing the content of one of the plurality of software modules. During decryption, it is verified that a level of security associated with each of the plurality of encrypted software modules is not higher than the level of security of the build plan. This can be performed implicitly, for example, by ensuring that the level of the software repository to which the build plan is provided does not store keys for security levels higher than the build plans provided to that level.

At 406, a new cryptographic hash for each of the plurality of software modules, for example, by a same method as the original cryptographic hash stored with the software module was produced. At 408, it is verified that the new cryptographic hash for each of the plurality of software modules matches the stored cryptographic hash representing the content of the software module. If the two hashes match, the method advances to 410. If one of the new cryptographic hashes does not match the stored cryptographic hash, the method advances to 412, where an error message is generated. In this instance, the software module is not released to a build environment.

At 410, the plurality of software modules are provided to a build environment, for example, via a cross domain solution. At 412, a software build, comprising a plurality of software artifacts, is generated from the plurality of software modules. In one implementation, these software artifacts can themselves be archived for storage. In this implementation, the plurality of software artifacts are combined into an archive file, and a build hash representing the contents of the archive file is generated. Each of the archive file and the build hash are encrypted using an encryption key associated with the security level of the software build to provide an encrypted build file, which is then sent to the software repository or a separate build repository.

FIG. 6 is a schematic block diagram illustrating an exemplary system 600 of hardware components capable of implementing examples of the systems and methods disclosed herein. The system 500 can include various systems and subsystems. The system 500 can be a personal computer, a laptop computer, a workstation, a computer system, an appliance, an application-specific integrated circuit (ASIC), a server, a server BladeCenter, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard, touch screen, and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that may be needed to operate a computer. The memories 506, 508 and 510 can be implemented as computer-readable media (integrated or removable), such as a memory card, disk drive, compact disk (CD), or server accessible over a network. In certain examples, the memories 506, 508 and 510 can comprise text, images, video, and/or audio, portions of which can be available in formats comprehensible to human beings.

Additionally or alternatively, the system 500 can access an external data source or query source through the communication interface 512, which can communicate with the system bus 502 and the communication link 514.

In operation, the system 500 can be used to implement one or more parts of a system in accordance with the present invention. Computer executable logic for implementing the diagnostic system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution. This medium may be distributed across multiple discrete assemblies all operatively connected to a common processor or set of related processors.

Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

In the preceding description, specific details have been set forth in order to provide a thorough understanding of example implementations of the invention described in the disclosure. However, it will be apparent that various implementations may be practiced without these specific details. For example, circuits, systems, networks, processes, and other components may be shown as components in block diagram form in order not to obscure the example implementations in unnecessary detail. In other instances, well-known circuits, processes, algorithms, structures, and techniques may be shown without unnecessary detail in order to avoid obscuring the examples. The description of the example implementations will provide those skilled in the art with an enabling description for implementing an example of the invention, but it should be understood that various changes may be made in the function and arrangement of elements without departing from the spirit and scope of the invention. Accordingly, the present invention is intended to embrace all such alterations, modifications, and variations that fall within the scope of the appended claims.

What is claimed is:

1. A method comprising:
generating a software build comprising a plurality of software artifacts from a plurality of software modules, the software build having an associated build number that identifies the software build;
combining the plurality of software artifacts into an archive file;
generating a build hash representing the contents of the archive file;
encrypting the given archive file and the build hash using an encryption key associated with the security level of the software build to provide an encrypted build file;
sending the encrypted build file to a build repository;
developing a software module associated with the software build;
reviewing the software module to establish a security level for the software module;
generating a cryptographic hash representing the contents of the software module using a hash key that is uniquely associated with the build number;
encrypting the software module and the cryptographic hash using a key to provide an encrypted software module, the key being associated with the security level of the software module; and
sending the encrypted software module to a software repository.

2. The method of claim 1, further comprising:
providing a build plan requiring a plurality of software modules, which comprises the software module, to a software repository storing a plurality of encrypted software modules corresponding to the plurality of software modules;
decrypting each of the plurality of encrypted software modules to provide the plurality of software modules and a plurality of cryptographic hashes, which comprises the cryptographic hash, each representing the content of one of the plurality of software modules;
generating a new cryptographic hash for each of the plurality of software modules;
verifying that the new cryptographic hash for each of the plurality of software modules matches the cryptographic hash representing the content of the software module;
selecting a build environment based on a level of security associated with the build plan; and
providing the plurality of software modules to the selected build environment.

3. The method of claim 1, wherein developing a software module comprises:
retrieving an existing software module and an error report from the software repository; and modifying the existing software module in accordance with the error report to provide the software module.

4. The method of claim 1, wherein the software repository is a multi-level software repository comprising a plurality of levels with associated levels of security, and sending the encrypted software module to the software repository comprises sending the encrypted software module to one of the plurality of levels that corresponds to the security level for the software module.

5. The method of claim 1, wherein generating the cryptographic hash representing the contents of the software module comprises generating the cryptographic hash with a Secure Hash Algorithm (SHA).

6. A method comprising:

providing a build plan requiring a plurality of software modules to a software repository storing a plurality of encrypted software modules corresponding to the plurality of software modules;

decrypting each of the plurality of encrypted software modules to provide the plurality of software modules and a plurality of cryptographic hashes, each representing the content of one of the plurality of software modules;

generating a new cryptographic hash for each of the plurality of software modules;

verifying that the new cryptographic hash for each of the plurality of software modules matches the cryptographic hash representing the content of the software module;

providing the plurality of software modules to a selected build environment generating a software build, comprising a plurality of software artifacts, from the plurality of software modules;

combining the plurality of software artifacts into an archive file;

generating a build hash representing the contents of the archive file;

encrypting the given archive file and the build hash using an encryption key associated with the security level of the software build to provide an encrypted build file; and sending the encrypted build file to a build repository.

7. The method of claim 6, further comprising:

developing a given software module of the plurality of software modules;

reviewing the given software module to establish a security level for the software module;

generating a cryptographic hash representing the contents of the given software module;

encrypting the given software module and the cryptographic hash using a key to provide one of the plurality of encrypted software modules, the key being associated with the security level of the given software module; and sending the encrypted software module to the software repository.

8. The method of claim 6, wherein providing the plurality of software modules to a selected build environment comprises providing the plurality of software modules to the selected build environment via a cross domain solution.

9. The method of claim 6, wherein decrypting each of the plurality of encrypted software modules comprises verifying that a level of security associated with each of the plurality of encrypted software modules is not higher than the level of security of the build plan.

10. The method of claim 6, further comprising, when the new cryptographic hash for one of the plurality of software modules does not match the cryptographic hash representing the content of the one of the plurality of software modules, generating an error message and preventing the one of the plurality of software modules from being provided to the build environment.

\* \* \* \* \*